INVENTOR.
GIUSEPPE ALFIERI

United States Patent Office 3,147,049
Patented Sept. 1, 1964

3,147,049
ANTI-BACKLASH ANTI-FRICTION BEARING ASSEMBLY
Giuseppe Alfieri, Milan, Italy, assignor to Fabbrica Italiana Magneti Marelli S.p.A., Milan, Italy, a corporation of Italy
Filed Sept. 6, 1961, Ser. No. 136,325
Claims priority, application, Italy, Oct. 1, 1960, 17,054/60
3 Claims. (Cl. 308—174)

The present invention relates to a leveller for pneumatic suspension vehicles, with automatic recovery of the backlash in the support bearing of the control shaft.

The levellers of the known type have the disadvantage of more or less rapid wear of the coupling between bearing and control shaft of the inlet and outlet valves of the air springs.

In fact, to the shaft there is fixed, externally of the leveller, the end of a control lever, to the other end whereof is connected, by means of an articulation, the upper end of a bar connected with one of the elements of the unsuspended parts of the vehicle.

The oscillation frequency proper of the unsuspended parts oscillations is relevant (10 to 15 Hz.) whereas their amplitude is generally low.

These oscillations, transmitted by the connecting bar to the end of the control lever, provoke angular movements of the leveller having a reduced amplitude, but a frequency equal to that of the oscillations proper of the unsuspended parts. The shaft and the bearings supporting it are, therefore, in an entirely unfavorable condition as concerns their lubrication; in fact, their low speed and small amplitude of oscillation do not promote the formation nor the maintenance of a film of lubricant that would avoid a direct contact between the shaft and bearings.

The lack of lubrication and the consequent direct metal contact promote wear of the bearing or shaft, or of both of them at the same time, and, therefore, the formation of an excessive backlash which provokes, in turn, hammering of the parts and a progressively increasing play.

In the case of ball and roller bearings the play between races and rollers or balls, necessary for their operation, provokes the hammering between the races and the rollers or balls with a consequent deformation and successive rapid deterioration of the said parts. The resulting excessive plays determine a decrease of the sensitivity of the leveller. These inconveniences are prevented by the leveller according to the present invention, substantially characterized by the fact that the shaft actuating the inlet and outlet valves is supported by at least one ball or roller bearing biased by an axial load determining an axial thrust between the outer and inner races of the bearing itself, such as to annul the play between the balls or rollers and relative races also during the action of the unsuspended parts of the vehicle upon the oscillating lever keyed to the shaft.

The device will be described with reference to the schematic drawing herewith annexed, given by way of indicative example.

Figure 1:
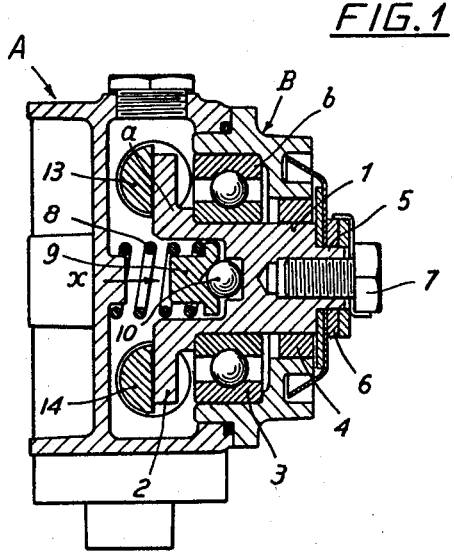
Figure 2:
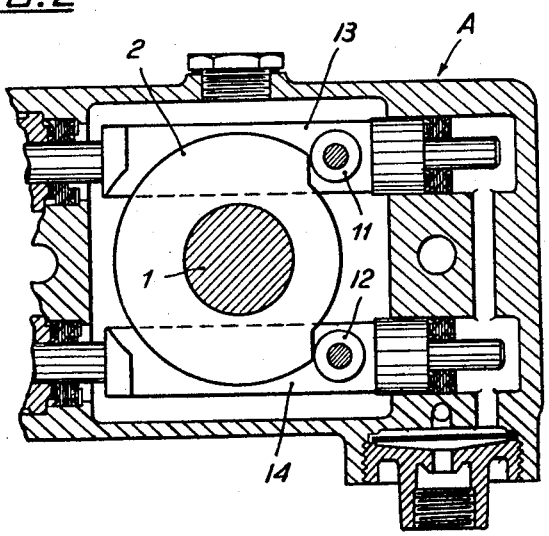

The FIG. 1 is a cross section through the control shaft of a leveller realized according to the invention;

The FIG. 2 is an axial view of a detail of the valve actuating organ mounted upon the control shaft.

With reference to the said figures, with A is indicated the base body of the leveller, to which is applied the cover B provided with the support means of the control shaft 1.

In the example illustrated, the shaft 1 is made in a single piece with the cam 2 actuating the levelling valves and the support $b$ is constituted by a ball bearing 3 supported in turn by the cover B which has an axial shoulder limiting movement of the bearing in the direction of the arrow X. The shaft 1 projects outwardly (protected by an annular packing 4) and on the projection 5 is keyed in a known manner the oscillating lever 6, which is operated by an element of the unsuspended parts of the vehicle. The axial connection between the shaft and the lever is realized by the end screw 7.

The shaft 1 is provided with an axial shoulder $a$ for the inner race of the bearing 3, opposite the shoulder $b$ for the outer race of the same bearing, realized by the cover B.

Between the body A and the shaft 1 there is arranged a helicoidal spring 8 acting axially on the shaft, so as to create an axial load upon the ball or roller bearing 3. Between the spring 8 and the shaft 1 a small washer 9 and a ball 10 are interposed to reduce the rotational friction between the two parts. The load exerted by the spring 8 is such as to not only annul the radial play between the balls and the races of the bearing but also prevent that, under the hammering action of the oscillations transmitted by the shaft 1 from the unsuspended portion of the vehicle (through the lever 6) balls and races may lose their reciprocal contact.

The cam 2 operates in a known manner through the rollers 11 and 12 the actuating bars 13 and 14 of the shutters of the inlet and outlet valves of the air compressed by the air valves. (See, for example, the copending patent application Serial No. 136,324, filed September 6, 1961.)

The constructional details of the leveller and of the means for loading the bearing may even vary from the described and illustrated ones without departing from the ambit of the invention, and therefore, from the domain of the Letters Patent.

I claim:

1. An anti-friction bearing assembly comprising, in combination, housing means; a shaft; an anti-friction bearing rotatably mounting said shaft in said housing means and including an inner race, an outer race, and anti-friction elements disposed between said races; said housing means having an internal annular shoulder facing one end of said shaft and abutting said outer race; said shaft having an annular shoulder facing the opposite end of said shaft and abutting said inner race; a spring seat in said housing means in axially aligned spaced relation to said one end of said shaft; a cylindrical recess extending axially inwardly from said one end of said shaft and concentric with said races; spring seat means within said recess in rotatable engagement with the inner end surface thereof; and a compression spring engaged between said spring seat and said spring seat means and biasing said shaft in the direction of said opposite end thereof to take up backlash in said anti-friction bearing.

2. An anti-friction bearing assembly, as claimed in claim 1, in which said spring seat means comprises a spring seat member having a cylindrical portion embraced by one end of said spring and a flange seating said one end of said spring, and a bearing ball disposed between a surface of said spring seat member and the inner end surface of said recess.

3. An anti-friction bearing assembly, as claimed in claim 2, in which the inner end surface of said recess is substantially flat and extends diametrically of said shaft; the surface of said spring seat member engaging said ball bearing being substantially flat and extending substantially diametrically of said recess; the inner end surface of said recess having a second and smaller diameter recess extending centrally therefrom and seating said bearing ball, and the ball bearing seating surface of said spring seat member having a center recess to receive said bearing ball.

References Cited in the file of this patent

UNITED STATES PATENTS

| | | |
|---|---|---|
| 1,083,015 | Holzhausen | Dec. 30, 1913 |
| 1,493,416 | Angstrom | May 6, 1924 |
| 2,102,952 | Hellyar | Dec. 21, 1937 |
| 2,334,002 | Heintz | Nov. 9, 1943 |
| 2,735,733 | Cushman | Feb. 21, 1956 |

FOREIGN PATENTS

| | | |
|---|---|---|
| 827,276 | Germany | Jan. 10, 1952 |